F. M. LEWIS.
DIFFERENTIAL MECHANISM.
APPLICATION FILED APR. 23, 1917.
1,286,362.
Patented Dec. 3, 1918.
2 SHEETS—SHEET 1.
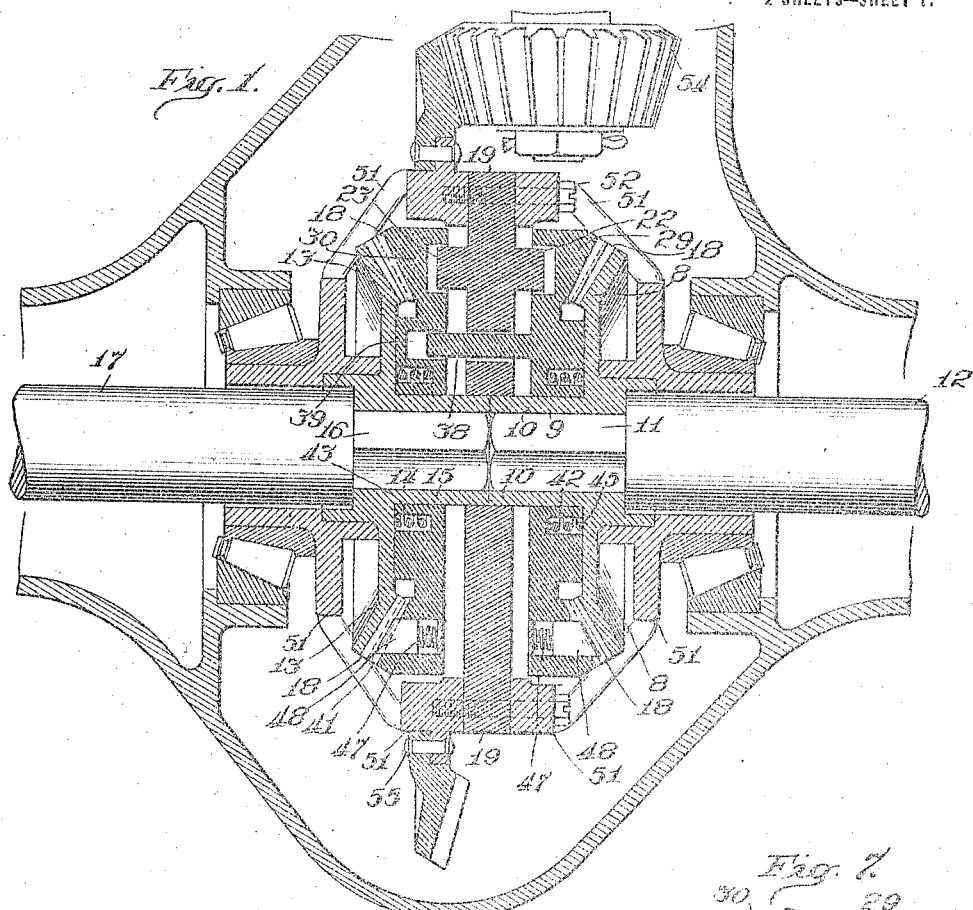
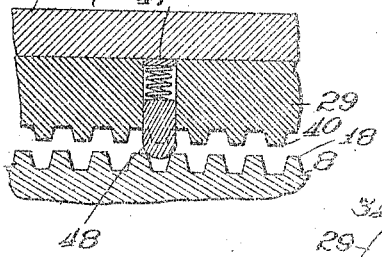
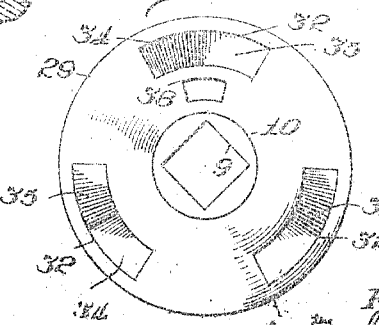
Inventor
Frank M. Lewis

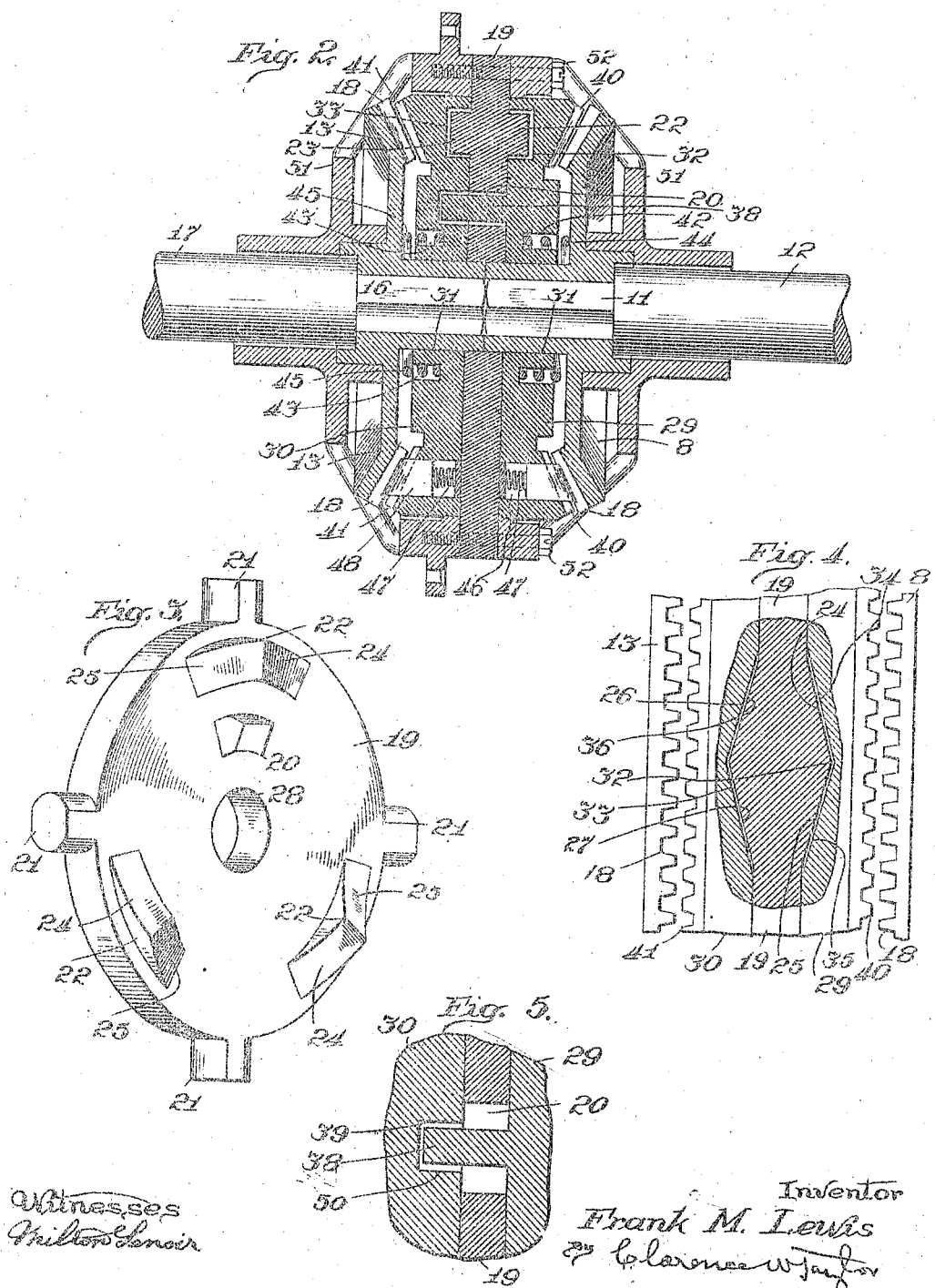

UNITED STATES PATENT OFFICE.

FRANK M. LEWIS, OF CHICAGO, ILLINOIS.

DIFFERENTIAL MECHANISM.

1,286,362.

Specification of Letters Patent.   Patented Dec. 3, 1918.

Application filed April 23, 1917. Serial No. 163,780.

*To all whom it may concern:*

Be it known that I, FRANK M. LEWIS, a citizen of the United States of America, residing at Chicago, in the county of Cook and State of Illinois, have invented certain new and useful Improvements in Differential Mechanism, of which the following is a specification.

My invention relates to improvements in differential mechanism; and the primary object of my improvement is to provide cam operated shiftable members of the positive drive type in mechanism of the class described.

A further object of my present improvement is to afford simple effective means to constantly urge the shiftable members out of power transmission engagement.

Another object of my present improvement is the provision of means carried by the shiftable members to limit relative rotative movement thereof.

With the above and other objects in view, my invention consists in the novel features and in the novel combination and arrangement of parts hereinafter more specifically described, illustrated in the accompanying drawings forming a part of this specification, and particularly pointed out in the claims hereunto appended. It will be understood that changes, variations and modifications in the details of the invention within the scope of the claims may be resorted to without departing from the spirit or sacrificing any of the advantages thereof.

In the accompanying drawings,—

Figure 1 is a horizontal central section of the rear axle and housing of a motor vehicle with my invention applied thereto;

Fig. 2 is a similar view showing the parts in disengaged position;

Fig. 3 is a perspective view of a driving member;

Fig. 4 is a plan view with parts broken away;

Fig. 5 is a detail of means for limiting relative rotative movement of the shiftable members;

Fig. 6 is a sectional detail of retarding means;

Fig. 7 is a sectional detail of the radial cams and recesses of the driving and shiftable members;

Fig. 8 is an elevation of a shiftable member.

Similar numerals refer to similar parts throughout the several views.

The numeral 8 denotes a tooth clutch member with squared axial opening 9, and hub 10 in which is fixed the squared end portion 11 of the independent shaft 12.

13 designates a tooth clutch member having a squared axial opening 14 and hub 15, to receive the squared end portion 16 of the independent shaft 17. The gear teeth 18 are adapted to positively engage with the shiftable tooth clutch members hereinafter referred to.

A driving member 19 is provided with a concentric slot 20 and radial studs 21. The radially disposed double cams 22 and 23 on the respective sides of the driving member have working faces 24, 25, 26 and 27. The axial opening 28 receives the hubs 10 and 15.

There is provided what is termed shiftable tooth clutch members 29 and 30 having axial openings 31 therethrough, by which said shiftable members are slidably mounted on the hubs 10 and 15 of the driven members 8 and 13, respectively.

Preferably the cam-recesses 32 and 33 are formed in the side of the shiftable tooth clutch members and have working faces 34, 35, 36 and 37, respectively.

The post 38 is integral with or may be attached to one of the shiftable tooth clutch members. The free end of the post is adapted to have a limited travel in the post-recess 39 of the other clutch member.

40 and 41 indicate the gear teeth on the respective shiftable tooth clutch members.

42 and 43 are the annular recesses in the shiftable tooth clutch members, and 44 and 45 the compression springs seated therein.

Retarding means to oppose relative rotative movement of the driven tooth clutch members and the shiftable tooth clutch members comprises the holes 46, compression springs 47 and bolt 48, the free end of which bears against the gear teeth of the adjacent driven tooth clutch member.

In case either of the shiftable members should stick in disengaged position when one wheel is running faster than the other, as the faster running wheel slows down the bolt 48, by exerting a backward dragging effect on the shiftable clutch member, causes the latter to reëngage the driven member under the influence of the cams on the driving member 19.

49 and 50 designate the opposite end walls of the post-recess 39.

51 is a rotatable housing, bolted together at 52.

53 is a non-rotatable housing.

54 is a bevel gear wheel riveted at 55 to the rotatable housing.

In Fig. 7 is shown a modified form of the radially disposed cams and cam-recesses. The numerals 56, 57, 60 and 61 indicate the working faces in the driving member and the numerals 58, 59, 62 and 63 denoting the working cam faces on the respective shiftable tooth clutch members.

In operation, when power is applied to the rotatable housing, the driving member is caused to rotate and change the positions of the cams in respect to the shiftable members which will be forced outwardly into positive engagement with the driven members.

The member 19, being attached to the rotatable housing, will be moved in either direction, forward or backward, as desired, and the cams 22 and 23, will push outwardly the shiftable tooth clutch members, 29 and 30, and thus force the teeth of the parts, 39, 30, into clutch engagement with the tooth clutch members 8, 13.

When either vehicle wheel is increased in speed, as in turning a corner, for instance in turning to the left, the members 8 and 29 will rotate together running ahead of the member 19 until the post 38 strikes the wall 49 of the member 30 (see Fig. 5) at which time the tension of the coil spring 44 under compression will force the part 29 out of engagement with the member 8 and the vehicle wheel will be free to rotate at the increased rate of speed, after which reëngagement of these parts takes place. The springs 44 are not indispensable to the operation of the mechanism, and may be omitted if desired.

Having thus fully described my invention, what I claim as new, and desire to secure by Letters Patent, is:

1. In differential mechanism, the combination of independent shafts, and driven tooth clutch members fixed to their opposing ends and formed with inwardly extending hubs, a driving member, and a pair of shiftable tooth clutch members each slidably mounted on one of said hubs and formed on one side for clutch engagement with a driven tooth clutch member and on the other side suitably formed for cam action with the driving member, whereby said shiftable tooth clutch members are moved into positive power transmitting engagement with the respective driven tooth clutch members.

2. In differential mechanism, the combination of independent shafts, and driven tooth clutch members fixed to their opposing ends, and formed with inwardly extending hubs, a driving member loosely mounted on the inner ends of said hubs, a pair of shiftable tooth clutch members each slidably mounted on one of said hubs and formed on one side for positive engagement with a driven tooth clutch member and on the other side suitably formed for cam action with the driving member, whereby the shiftable tooth clutch members are moved into positive power transmitting engagement with the respective tooth clutch members, and means to limit relative rotative movement of the shiftable tooth clutch members.

3. In differential mechanism, in combination with independent shafts and tooth clutch members fixed to their opposing ends, a driving member, a plurality of shiftable tooth clutch members each formed on one side for positive power transmitting engagement with a tooth clutch member and on the other side suitably formed for cam action with the driving member to move the shiftable tooth clutch members into positive power transmitting engagement with the respective tooth clutch members, means to limit relative rotative movement of the shiftable tooth clutch members and yieldable means to urge the shiftable tooth clutch members out of power transmitting engagement with the tooth clutch members.

4. In differential mechanism, in combination with independent shafts and tooth clutch members fixed to their opposing ends, a driving member, a plurality of shiftable tooth clutch members, each formed on one side for positive engagement with a tooth clutch member and on the other side suitably formed for cam action with the driving member to move the shiftable tooth clutch members into positive power transmitting engagement with the respective tooth clutch members, means to limit relative rotative movement of the shiftable tooth clutch members, means to oppose relative rotative movement of each shiftable tooth clutch member with its driven member, and means to constantly urge each shiftable member away from its tooth clutch member.

5. In differential mechanism, in combination, a driving member having radially disposed double cams on both sides, tooth clutch members, a shiftable tooth clutch member on both sides of the driving member formed and adapted for positive engagement with the tooth clutch members, means to limit relative rotative movement of the shiftable tooth clutch members, and means to urge the shiftable tooth clutch members out of engagement with the tooth clutch members.

6. In differential mechanism, in combination, a driving member having radially disposed double cams on both sides, tooth clutch members, a shiftable tooth clutch member on both sides of the driving member and formed and adapted for positive engagement with the tooth clutch members, means to limit relative rotative movement of the shiftable tooth clutch members, means to urge the shiftable tooth clutch members out of engagement with the driven tooth clutch members, and yieldable means to oppose relative rotative movement of the shiftable tooth clutch members with the adjacent tooth clutch members.

7. In differential mechanism, the combination with a rotatable housing made in separable parts bolted together, of a driving member having radial studs clamped between the meeting parts of said housing and formed with cams on its sides, independent axles having their proximate ends entering the opposite sides of said housing, driven members fast on the inner ends of said axles within said housing, and laterally shiftable tooth clutch members between said driving member and said driven members normally urged into engagement with the latter by the cams on said driving member.

In testimony whereof I affix my signature in the presence of a witness.

FRANK M. LEWIS.

Witness:
SCOTT M. HOGAN.